(12) United States Patent
Cloutier

(10) Patent No.: US 9,329,619 B1
(45) Date of Patent: May 3, 2016

(54) CARDS WITH POWER MANAGEMENT

(75) Inventor: Bruce S. Cloutier, Jeannette, PA (US)

(73) Assignee: DYNAMICS INC., Pittsburgh, PA (US)

( * ) Notice: Subject to any disclaimer, the term of this patent is extended or adjusted under 35 U.S.C. 154(b) by 749 days.

(21) Appl. No.: 12/716,204

(22) Filed: Mar. 2, 2010

Related U.S. Application Data

(60) Provisional application No. 61/166,909, filed on Apr. 6, 2009, provisional application No. 61/220,501, filed on Jun. 25, 2009, provisional application No. 61/234,406, filed on Aug. 17, 2009, provisional application No. 61/247,143, filed on Sep. 30, 2009, provisional application No. 61/247,183, filed on Sep. 30, 2009.

(51) Int. Cl.
*G06F 1/00* (2006.01)
*G07C 9/00* (2006.01)
*H04B 5/00* (2006.01)

(52) U.S. Cl.
CPC .... *G06F 1/00* (2013.01); *H04B 5/00* (2013.01)

(58) Field of Classification Search
CPC .............. G06F 1/00; G07C 9/00; H04B 5/00
USPC ......................................................... 713/300
See application file for complete search history.

(56) References Cited

U.S. PATENT DOCUMENTS

| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |

(Continued)

FOREIGN PATENT DOCUMENTS

| JP | 05210770 A | 8/1993 |
| WO | WO9852735 | 11/1998 |

(Continued)

OTHER PUBLICATIONS

Praca, Denis. Claude Barral. "From smart cards to smart objects: the road to new smart technologies" Computer Networks #36 (2001) pp. 381-389.*

(Continued)

*Primary Examiner* — Jaweed A Abbaszadeh
*Assistant Examiner* — Terrell Johnson

(57) ABSTRACT

A card with power management circuitry is provided. A card may have circuitry contained therein (e.g., a processor) that may have a maximum operating voltage. The card may include a power source (e.g., a battery) that provides power ranging in voltage from a maximum power source voltage to a minimum power source voltage. The maximum power source voltage is greater than the maximum operating voltage. Power management circuitry is provided to manage the power received from the power source such that the voltage provided to the circuitry (e.g., processor) does not exceed the maximum operating voltage.

25 Claims, 8 Drawing Sheets

(56) References Cited

U.S. PATENT DOCUMENTS

| | | |
|---|---|---|
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,027,029 A * | 2/2000 | Kim ............... 235/492 |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,747,440 B2 * | 6/2004 | Weder ............... 323/276 |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| 8,011,577 B2 | 9/2011 | Mullen et al. |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,172,148 B1 | 5/2012 | Cloutier et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,382,000 B2 | 2/2013 | Mullen et al. |
| 8,393,545 B1 | 3/2013 | Mullen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| 8,485,437 B2 | 7/2013 | Mullen et al. |
| 8,511,574 B1 | 8/2013 | Yen et al. |
| 8,517,276 B2 | 8/2013 | Mullen et al. |
| 8,579,203 B1 | 11/2013 | Lambeth et al. |
| 8,590,796 B1 | 11/2013 | Cloutier et al. |

(56) References Cited

U.S. PATENT DOCUMENTS

| | | |
|---|---|---|
| 8,608,083 B2 | 12/2013 | Mullen et al. |
| 8,622,309 B1 | 1/2014 | Mullen et al. |
| 8,668,143 B2 | 3/2014 | Mullen et al. |
| 8,733,638 B2 | 5/2014 | Mullen et al. |
| 8,757,483 B1 | 6/2014 | Mullen et al. |
| 8,757,499 B2 | 6/2014 | Cloutier et al. |
| 8,881,989 B2 | 11/2014 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,064,225 B2 | 6/2015 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226041 A1* | 12/2003 | Palmer et al. ............... 713/202 |
| 2003/0226899 A1 | 12/2003 | Finkelstein |
| 2004/0035942 A1 | 2/2004 | Silverman |
| 2004/0133787 A1 | 7/2004 | Doughty |
| 2004/0158728 A1* | 8/2004 | Kim ............................ 713/194 |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0164054 A1* | 7/2006 | Wang et al. ............... 323/282 |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0183205 A1* | 8/2007 | Lee .......................... 365/185.18 |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0246439 A1* | 10/2008 | Tsui et al. ..................... 320/137 |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0009138 A1* | 1/2009 | Ahmad et al. ................. 320/137 |
| 2009/0011706 A1* | 1/2009 | Wilson et al. ................ 455/41.1 |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159709 A1 | 6/2009 | Mullen |
| 2009/0159710 A1 | 6/2009 | Mullen et al. |
| 2009/0159712 A1 | 6/2009 | Mullen et al. |
| 2009/0160617 A1 | 6/2009 | Mullen et al. |
| 2009/0188105 A1* | 7/2009 | Chien et al. ................... 29/623.4 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2011/0028184 A1 | 2/2011 | Cooper |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272477 A1 | 11/2011 | Mullen et al. |
| 2011/0272478 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0278364 A1 | 11/2011 | Mullen et al. |
| 2011/0282753 A1 | 11/2011 | Mullen et al. |
| 2011/0300799 A1* | 12/2011 | Da Fonseca et al. ......... 455/41.1 |
| 2012/0286037 A1 | 11/2012 | Mullen et al. |
| 2012/0318871 A1 | 12/2012 | Mullen et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |

(56) References Cited

U.S. PATENT DOCUMENTS

FOREIGN PATENT DOCUMENTS

| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.
U.S. Appl. No. 60/594,300, Poidomani et al.
U.S. Appl. No. 60/675,388, Poidomani et al.
PCT/US11/25047, Feb. 16, 2011, Mullen.
PCT/US11/37041, May 18, 2011, Mullen et al.
PCT/US11/45991, Jul. 29, 2011, Mullen et al.
PCT/US12/31919, Apr. 2, 2012, Mullen et al.
PCT/US12/31921, Apr. 2, 2012, Mullen et al.
PCT/US12/37237, May 10, 2012, Mullen et al.
PCT/US13/26746, Feb. 19, 2013, Mullen et al.

\* cited by examiner

US 9,329,619 B1

CARDS WITH POWER MANAGEMENT

CROSS-REFERENCE TO RELATED APPLICATION

This application claims the benefit of U.S. Provisional Patent Application Nos. 61/166,909 filed on Apr. 6, 2009, 61/220,501 filed on Jun. 25, 2009, 61/234,406 filed on Aug. 17, 2009, 61/247,143 filed on Sep. 30, 2009, and 61/247,183 filed on Sep. 30, 2009 all of which are hereby incorporated by reference herein in their entirety.

BACKGROUND OF THE INVENTION

This relates to cards with circuitry.

Powered cards or electronic cards that include components such as a battery, a microprocessor, and other circuitry may be assembled to have similar dimensions to credit or debit cards or other cards which may include a magnetic stripe, for example. The battery may be operable to supply power that changes in voltage over time. For example, the supplied voltage may initially be too high for some of the circuitry in the card. As the battery energy decreases, the voltage may decrease to a voltage level too low for some of the circuitry to properly function.

What is needed is circuitry that compensates for the change in voltage supplied by a power source.

SUMMARY OF THE INVENTION

Power management circuitry for managing power received from a power source is provided. The power management circuitry is operative to manage the received power to ensure that the voltage provided does not exceed a maximum operating voltage for various circuitry in the card. In one embodiment, the power management circuitry may selectively route the received power through a voltage protection path and a direct voltage path. The voltage protection path may include circuitry that causes the voltage of the received power to drop by a predetermined voltage threshold. The direct voltage path includes circuitry that enables the managed power voltage to be substantially the same as the received power voltage. The path selected may depend on a monitored voltage (e.g., either the received power voltage or the managed power voltage). For example, power may be routed through the voltage protection path at least until managed power voltage is at or below the maximum operating voltage, at which the power may then be routed through the direct voltage path.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
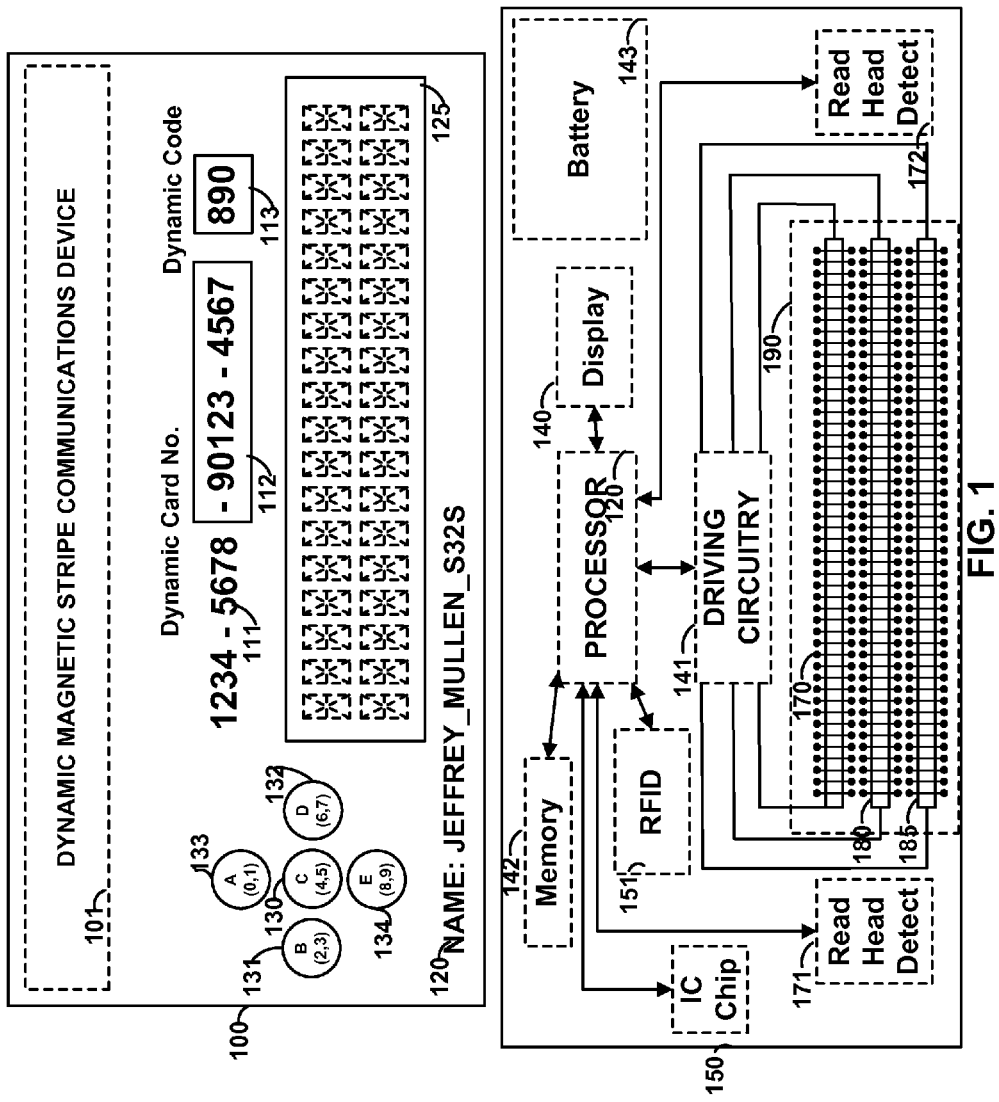
FIGS. 1-2 show illustrations of different card embodiments.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card.

Any number of reader communication devices may be included in architecture 150. For example, IC chip 150 may be included to communicate information to an IC chip reader. IC chip 150 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 150, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185. Although not explicitly shown, power management circuitry according to embodiments of the invention may be included in card 150.

Figure 2:
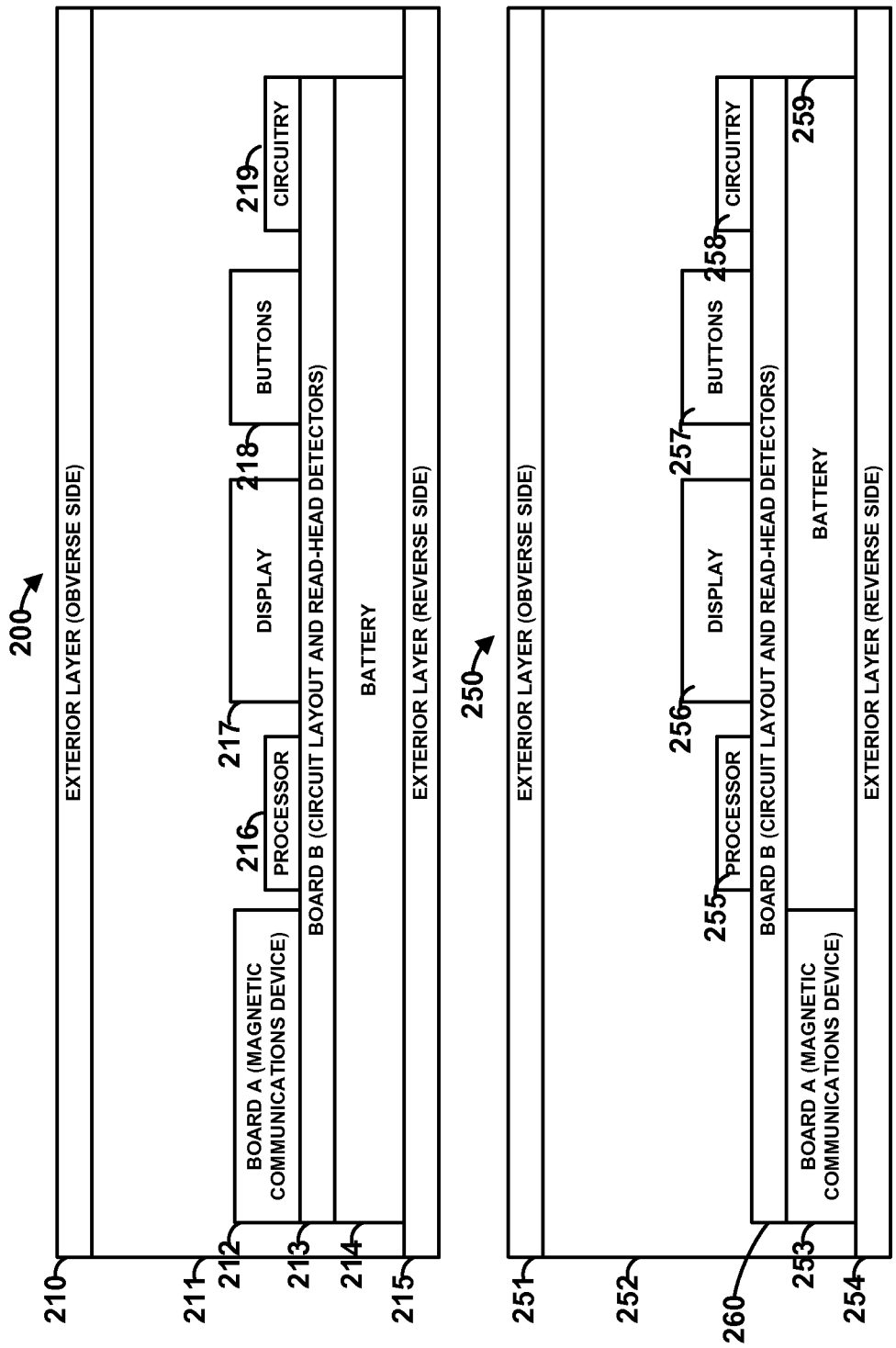

FIG. 2 shows illustrative cross-sectional view of card 200. Card 200 may be, for example, between 25 and 40 thousandths of an inch thick (e.g., approximately between 30 and 33 thousandths of an inch thick). Card 200 may include, for example, layer 210. Layer 210 may be a polymer, such as a polyethelene terephthalate. Similarly, layer 215 may be included as a polymer, such as polyethelene terephthalate. Layers 210 and 215 may be a laminate material or a composite laminate material. During construction of card 200, an electronics package circuitry (e.g., board 212, which may be a dynamic magnetic stripe communications device, power management circuitry, processor 216, display 217, buttons 218, additional circuitry 219, board 213, and battery 214) may be fixed (e.g., glued) to layer 215, material 211 may be injected onto the electronic circuitry package, and layer 210 may be applied to material 211. Material 211 may be formed from one or more polyurethane-based or silicon-based substances. Material 211 may be a substance that changes its physical state (e.g., changes from a liquid substance to a solid substance) when subjected to one or more predetermined conditions (e.g., heat, pressure, light, or a combination thereof) for a predetermined period of time.

To fabricate a card that is approximately 33 thousandths of an inch thick, for example, layers 215 and 210 may be approximately 5 to 7 thousandths of an inch thick (e.g., 5 thousandths of an inch thick). An electronics package may have a maximum thickness ranging between approximately 10-20 thousandths of an inch, between approximately 12-18 thousandths of an inch, between approximately 14-18 thousandths of an inch, or approximately 16 thousandths of an inch. Material 211 may have a thickness that ranges between approximately 1-16 thousands of an inch, between 3-10 thousands of an inch, or approximately 7 thousandths of an inch. The thickness of material 211 may vary depending on a height profile of the electronics package. Thus, for portions of the electronic package having a relatively tall height (e.g., 16 mils), the thickness of material 211 residing on that portion may be less thick than a portion of material 211 residing on a portion of the electronics package having relatively short height (e.g., 9 mils). The combined thickness of the electronic package and material 211 may range between approximately 8-26 mils, 14-24 mils, 16-23 mils, 18-22 mils, 20-23 mils, 16-20 mils, 19 mils, 20 mils, 21, mils, 22 mils, or 23 mils. If desired, a protective layer may be placed over layers 210 and 215. Such a protective layer may be between approximately 0.5 and 2 thousands of an inch thick or 1.5 thousandths of an inch thick.

In one embodiment, a card can be constructed so that the combined thickness of the electronics package and laminate 211 is approximately 21 mils and that the combined thickness of layers 210 and 215 is approximately 10 mils, resulting in a card having a thickness of approximately 31 mils. Persons skilled in the art will also appreciate that an injection molding process of a substance may allow that substance to fill into the groove and gaps of an electronics package such that the laminate may reside, for example, between components of an electronics package.

Card 200 may include an electronics package that includes, for example, board 212, which may be a dynamic magnetic communications device, power management circuitry, processor 216, display 217, buttons 218, additional circuitry 219, board 213, and battery 214. A permanent magnet may be, for example, provided as part of an assembled board 212 or fixed to the top of board 212. Board 213 may include, for example, capacitive read-head detectors placed about board 212. Battery 214 may be any type of battery, such as, for example, a flexible lithium polymer battery. Circuitry 219 may include, for example, one or more driver circuits (e.g., for a magnetic communications device), RFIDs, IC chips, light sensors and light receivers (e.g., for sending and communicating data via optical information signals), sound sensors and sound receivers, or any other component or circuitry for card 200.

Card 250 may be provided and may include, for example, exterior layers 251 and 254, board 253, board 260, processor 255, display 256, buttons 257, circuitry 258, and battery 259. Persons skilled in the art will appreciate that read-head detectors may be included, for example on board 253 or a different board (e.g., a board provided between board 253 and layer 254). Material 252 may be disposed between layers 251 and 254, covering the circuitry and permeating voids existing between circuit components.

Figure 3:
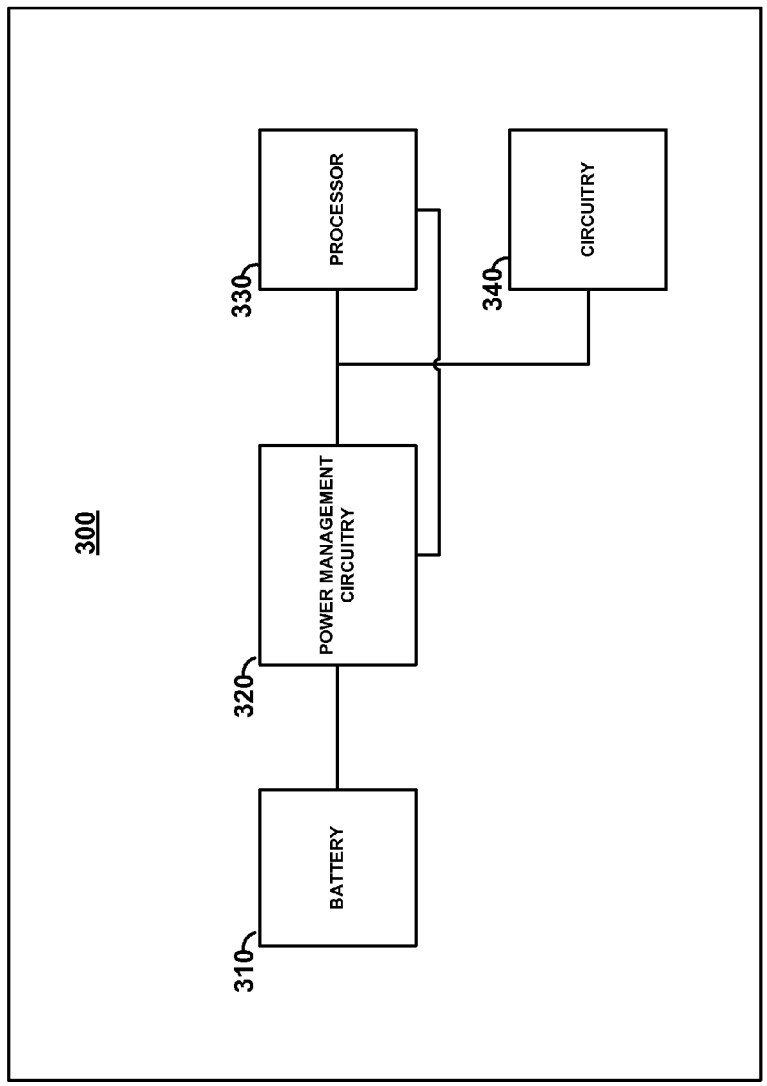
FIG. 3 shows an illustrative block diagram of a card including circuitry according to an embodiment of the invention.

FIG. 3 shows an illustrative block diagram of card 300. Card 300 may include battery 310, power management circuitry 320, processor 330, and other circuitry 340. Processor 330 may control various functions of card 300 and other circuitry 340 may represent circuitry other than battery 310, power management circuitry 320, and processor 330.

Battery 310 may be any suitable battery such as a lithium ion battery, a nickel cadmium battery, or an alkaline battery. Battery 310 may be a lithium polymer battery, which is sometimes abbreviated as Li-poly, Li-Pol, LiPo, PLI, or LiP. Lithium polymer batteries may supply power ranging in voltage between a maximum voltage (e.g., about 4.2 volts) and a minimum voltage (e.g., about 2.7 volts) before the battery is effectively dead. In some embodiments, a card having a LiP battery may be stored at an intermediate voltage (e.g., 3.6 or 3.7 volts) prior to being incorporated into the card, at which point, the battery may be charged to its maximum potential.

Battery 310 can be dimensioned to fit within the confines of a conventionally sized payment card such as a credit or debit card. The thickness of such cards may range between 31 and 33 thousandths of an inch. Battery 310 may have a thickness ranging between about 0.38 mm to about 0.45 mm, or more particularly, between about 0.40 mm to about 0.43 mm. In some embodiments, battery 310 may be about 0.40 mm thick, and in other embodiments, battery 310 may be about 0.41 mm, about 0.42 mm, or about 0.43 mm thick. As battery technology advances, battery 310 may be dimensioned to have a thickness less than 0.38 mm and meet desired power requirements.

Power management circuitry 320 may be operative to manage power supplied by battery 310 to processor 330 and circuitry 340. Processor 330 and other circuitry 340 may operate according to a predetermined range of power supply voltage. For example, processor 330 may operate between a processor-max voltage and processor-min voltage. The processor-max voltage may be less than the maximum voltage supplied by battery 310. Thus, if the maximum voltage supplied by battery 310 is provided to processor 330, processor 330 may be damaged. Power management circuitry 320 may be operative to limit the magnitude of the voltage provided to processor 330 when the battery supply voltage exceeds the processor-max voltage.

Power management circuitry 320 may manage power by conditioning it according to one of two different power states. The power received by power management circuitry 320 may be managed and provided as managed power. In a first power state (e.g., a voltage protection mode), power management circuitry 320 may introduce a fixed voltage drop. This fixed voltage drop may drop the battery supply voltage to a voltage level that does not damage circuitry within the card (e.g., such as processor 330). In a second power state (e.g., a direct voltage mode), power management circuitry 320 may substantially directly couple the battery supply voltage to processor 330 and other circuitry 340. Power management circuitry 320 may receive a signal from monitoring circuitry (e.g., processor 330) that specifies whether to operate in the first or second power state.

The monitoring circuitry monitors the voltage provided by power management circuitry 320 and provides the appropriate signal management circuitry. In one embodiment, processor 330 may function as the voltage monitoring circuitry. In another embodiment, the monitoring circuitry may include discrete circuitry (e.g., a voltage comparator). The monitoring circuitry may cause power management circuitry 320 to switch from the first to second state when the voltage provided by circuitry 320 equals or falls below a predetermined voltage level.

Figure 4:
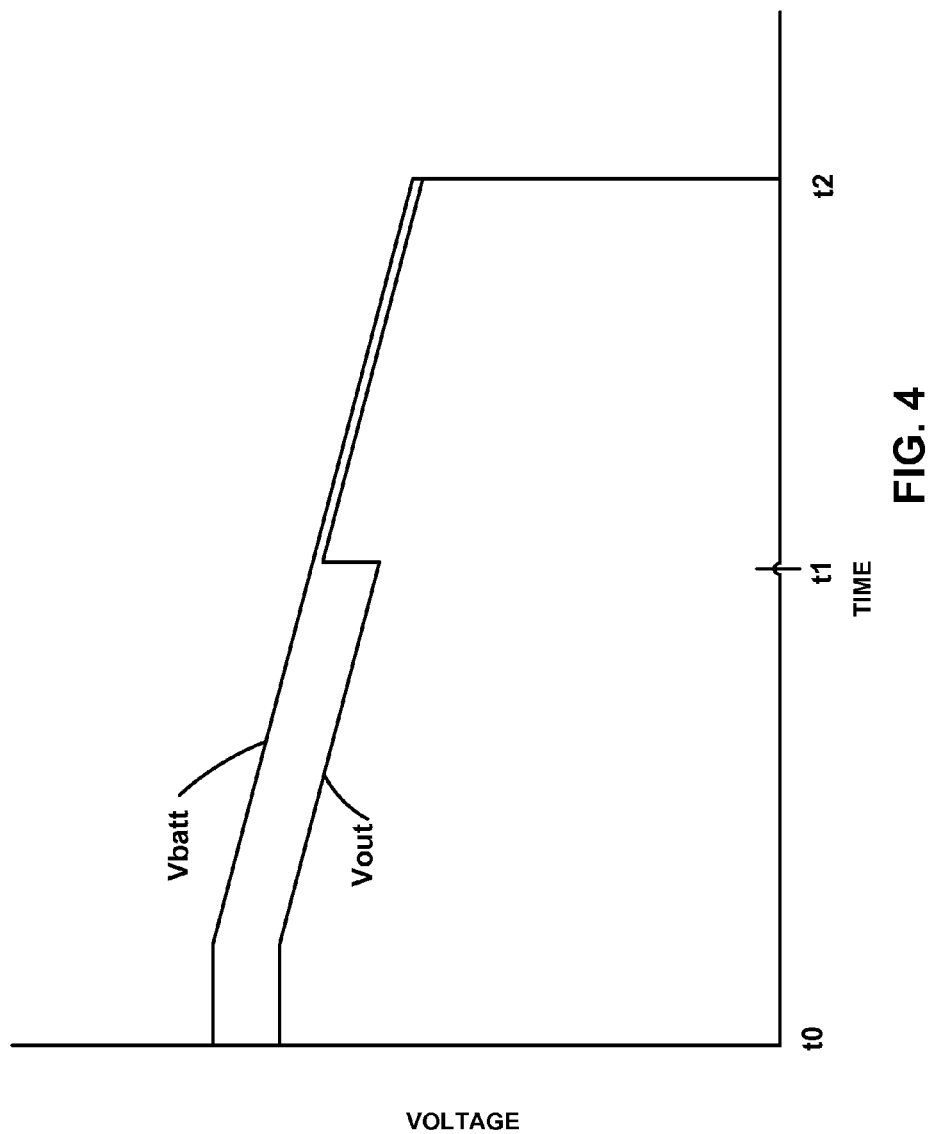
FIG. 4 shows an illustrative graph plotting signals versus time according to an embodiment of the invention.

FIG. 4 shows an illustrative diagram showing the battery voltage (Vbatt) and the voltage provided by power management circuitry (Vout) plotted against time. Between time t0 and t1, Vout is maintained at a predetermined voltage step below Vbatt. Power management circuitry 320 may operate in a voltage protection mode between times t0 and t1, as evidenced by the step reduction of Vout relative to Vbatt. At time t1, and after, power management circuitry 320 may operate in a direct voltage mode, as evidenced by the near identical mapping of Vout relative to Vbatt. It will be appreciated that Vout may not be exactly identical to Vbatt during the direct voltage mode and that it may be less than Vbatt due to losses in the system. In some embodiments, Vout may be substantially the same as Vbatt during the direct voltage mode.

Figure 5:
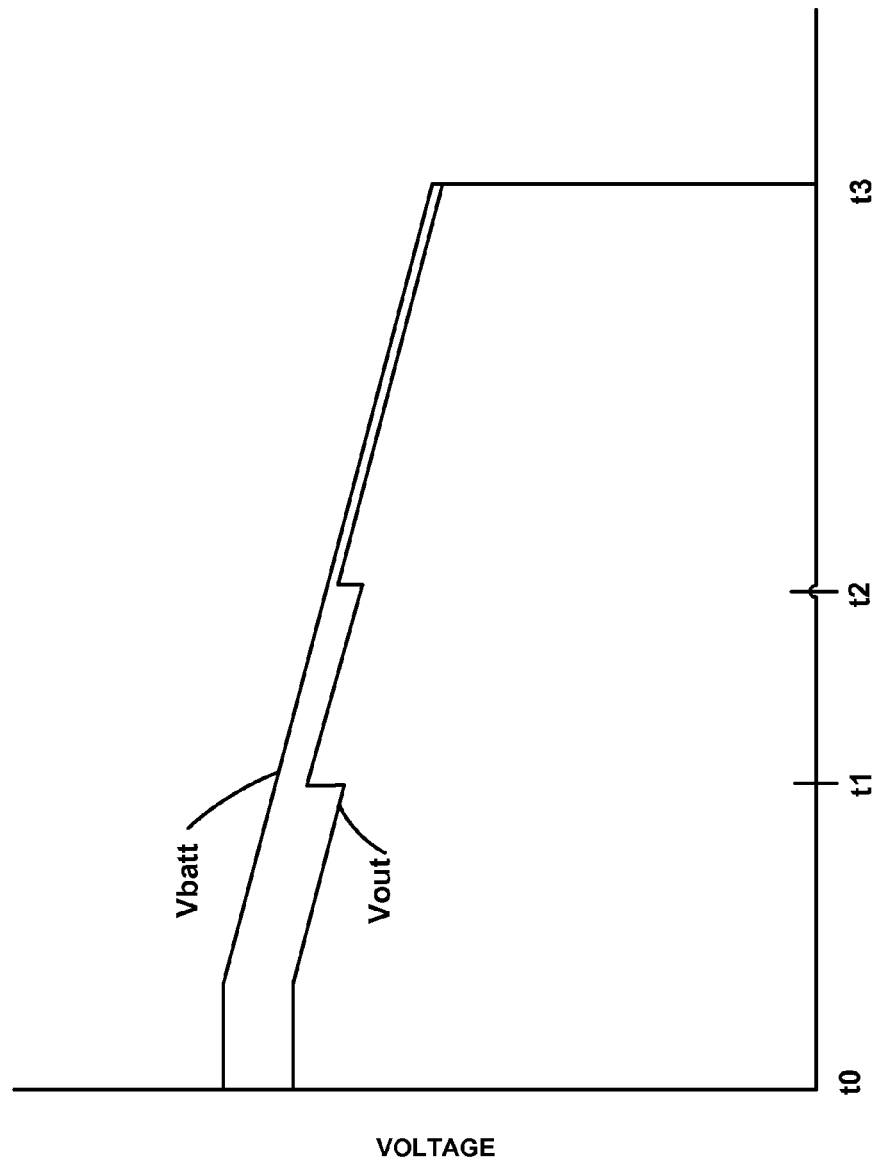
FIG. 5 shows an illustrative graph plotting signals versus time according to an embodiment of the invention.

In some embodiments, power management circuitry may be operative to step Vbatt down two or more different voltage drops during the voltage protection mode. FIG. 5 shows a diagram showing a multi-step voltage drop according to an embodiment. For example, between times t0 and t1, Vbatt is reduced by a first voltage threshold, and between times t1 and t2, Vbatt is reduced by a second voltage threshold. The first threshold voltage may be greater than the second threshold voltage. The first threshold voltage may ensure that circuitry (e.g., processor 330 and circuitry 340) is protected when the battery is supplying its peak voltage. The second threshold voltage may be applied when the battery is providing less than its peak voltage, but is still supplying power at a voltage that may be too high for various circuitry in the card. The second threshold voltage may provide the required voltage protection, yet provides a higher Vout to circuitry than the first threshold voltage. At time t2, power management circuitry may switch to and operate in a direct voltage mode, whereby Vout may be clamped substantially directly to Vbatt.

Figure 6:
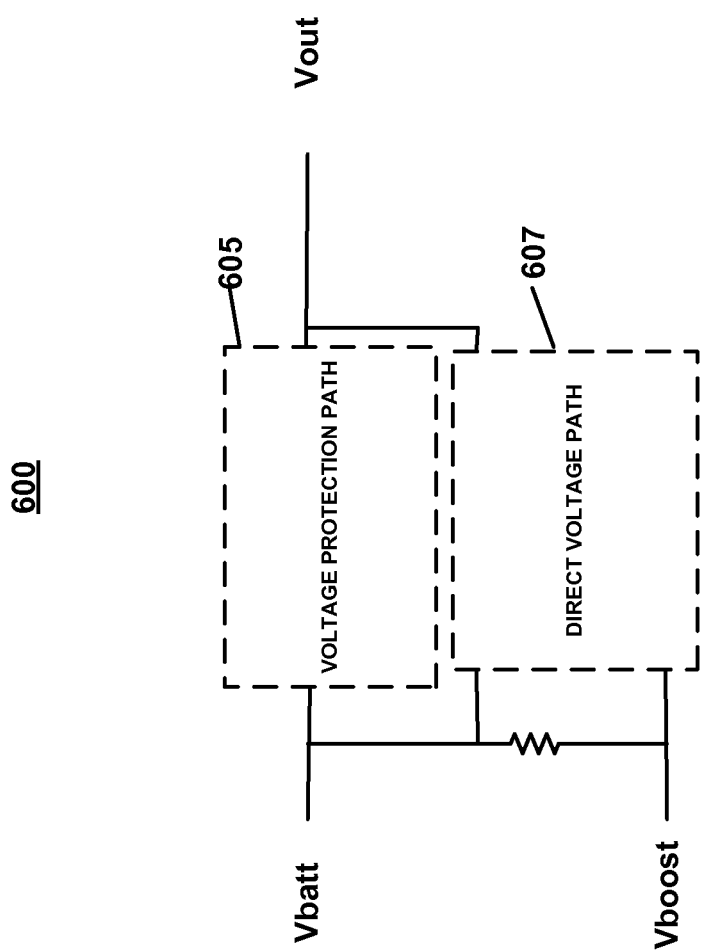
FIG. 6 shows an illustrative circuit diagram of circuitry according to an embodiment of the invention.

FIG. 6 shows an illustrative circuit diagram of power management circuitry 600 according to an embodiment of the invention. Circuitry 600 can include a battery input node, Vbatt, a signal input node, Vboost, and an output node, Vout. Circuitry can also include voltage protection pathway 605 and direct voltage pathway 607. Voltage protection pathway 605 may be connected to Vbatt and Vout and direct voltage pathway 607 may be connected to Vbatt, Vboost, and Vout.

During operation, power provided on Vbatt may be routed through voltage protection pathway 605 when operating in a voltage protection mode. The magnitude of the voltage signal provided on Vbatt may be stepped down by circuitry in pathway 605 to yield a Vout having a voltage magnitude suitable for other circuitry (e.g., a processor). In one embodiment, pathway 605 may provide a single predetermined voltage drop, which may be provided by a transistor, a diode, a resistor network, or a transistor network. In another embodiment, pathway 605 may provide multiple voltage drops (as discussed above in connection with FIG. 5).

When circuitry 600 operates in a direct voltage mode, power provided on Vbatt may be routed through direct voltage path 607. Direct voltage path 607 can effectively couple Vbatt directly to Vout by bypassing voltage protection path 605. Thus path 607 can provide a substantially lossless path for enabling Vout to substantially directly tract Vbatt. Power provided on Vbatt may be routed through pathway 607 depending on the signal provided on the signal input node, which signal may be provided by monitoring circuitry (not shown).

Figure 7:
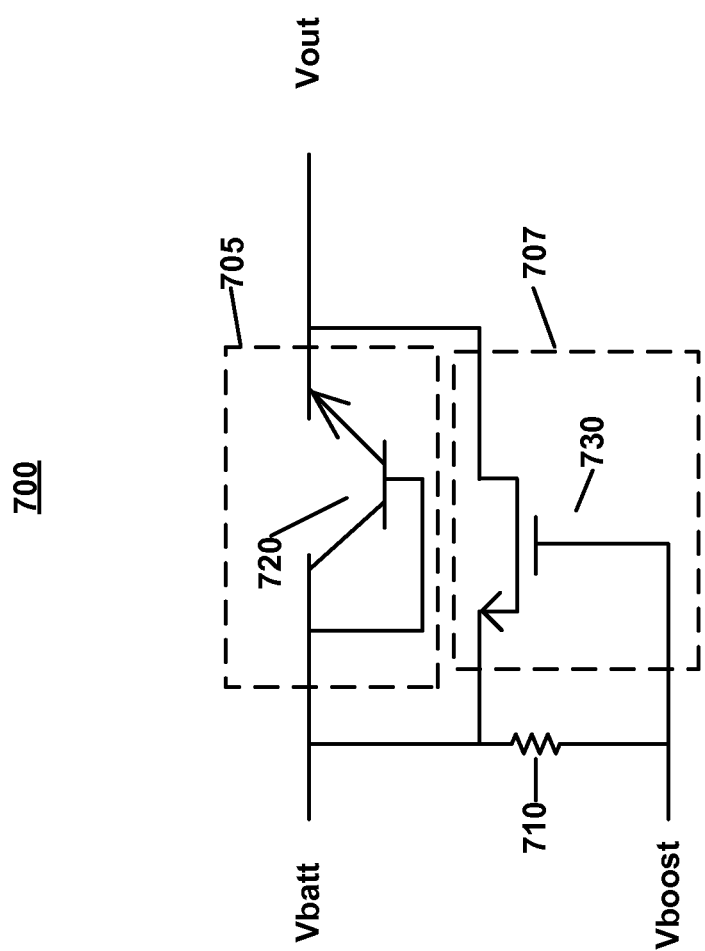
FIG. 7 shows an illustrative circuit diagram of circuitry according to an embodiment of the invention.

FIG. 7 shows an illustrative circuit diagram of power management circuitry 700 according to an embodiment of the invention. Circuitry 700 can include resistor 710, voltage protection path 705, which includes transistor 720 (e.g., a bjt transistor), and direct voltage path 707, which includes transistor 730 (e.g., a field effect transistor). The collector of transistor 720 may be coupled to a battery input node, Vbatt, and the emitter may be coupled to an output node, Vout. The base can be tied to the collector. This configuration can cause transistor 720 to operate as a transistor in diode drop mode. Resistor 710 can be electrically coupled to the battery input node, Vbatt, and a signal input node, Vboost. Vboost may be connected to voltage monitoring circuitry (not shown). Transistor 730 can have an emitter connected to Vbatt, a base connected to Vboost, and a source connected to Vout.

An advantage of circuitry 700 is that there are no current losses. This is particularly helpful in embodiments where the power source cannot be recharged. In addition, when operating in the direct voltage mode, the power source (e.g., a lithium polymer battery) is effectively directly coupled to the circuitry such as a processor via transistor 730. In embodiments where the power source is a lithium polymer battery, such a direct connection advantageously eliminates power losses that may otherwise be present, but for such a direct connection.

During operation, in a voltage protection mode, Vboost is HIGH, which turns transistor 730 OFF. Vboost is pulled HIGH by Vbatt. When transistor 730 is OFF, power is routed through transistor 720 to Vout. Since transistor 720 is configured to operate as a diode drop transistor, the magnitude of the voltage provided at Vbatt can drop by the diode drop voltage across transistor 720. In a direct voltage mode, Vboost may be pulled low (by voltage monitoring circuitry), which causes transistor 730 to turn ON. When transistor 730 is ON, power provided on Vbatt bypasses transistor 720 and is substantially directly connected to Vout. Transistor 730 can operate as a switch that has negligible effect on the magnitude of the voltage provided by Vbatt.

Figure 8:
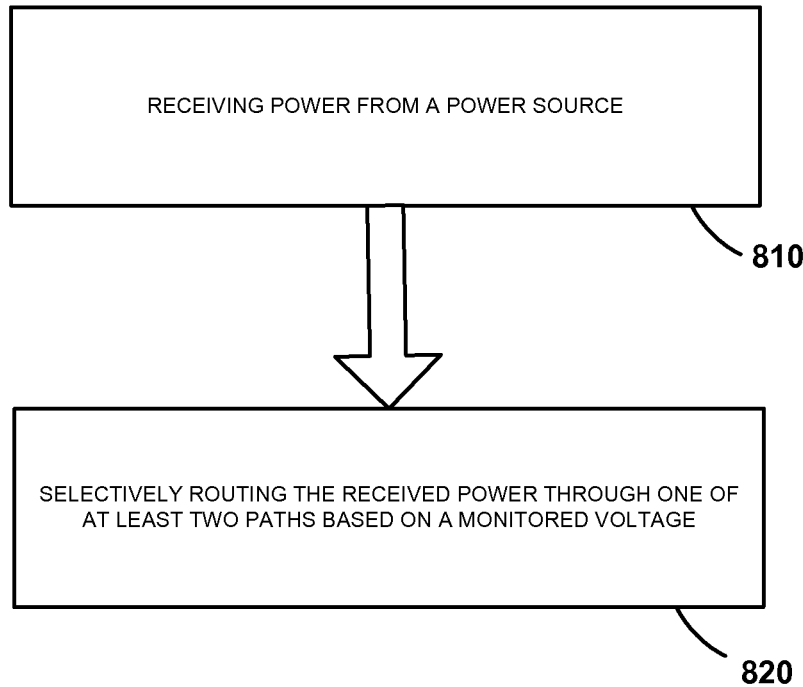
FIG. 8 shows an illustrative flow chart according to an embodiment of the invention.

FIG. 8 shows an illustrative flow chart of steps for managing supply of power according to an embodiment of the invention. Starting at step 810, power is received from a power source. At step 820, the power is selectively routed through one of at least two paths based on a monitored voltage magnitude. The monitored voltage magnitude may be the magnitude of the power signal provided by power management circuitry, or alternatively, the monitored voltage magnitude may be the magnitude of the power provided directly from the power source. If the monitored voltage magnitude is above a predetermined threshold, the selected path may be a voltage protection path. If the monitored voltage is at or below the predetermined threshold, the selected path may be a direct voltage path.

Persons skilled in the art will also appreciate that the present invention is not limited to only the embodiments described. Persons skilled in the art will also appreciate that the apparatus of the present invention may be implemented in other ways than those described herein. All such modifications are within the scope of the present invention, which is limited only by the claims that follow.

What is claimed is:

1. A card comprising:
    a power source operative to provide power via a power source voltage, a voltage range of the power source voltage including a maximum power source voltage and a minimum power source voltage;
    power management circuitry electrically coupled to the power source; and power consuming circuitry electrically coupled to the power management circuitry, the power consuming circuitry including a first circuitry with a maximum operating voltage that is less than the maximum power source voltage,
    wherein the power management circuitry is operative to provide power to the power consuming circuitry at a voltage less than the maximum operating voltage,
        the power management circuitry includes at least one circuit element selected from the group consisting of a transistor and a diode,
        the at least one circuit element is operable to receive an input signal, and the input signal is based on a comparison between a threshold and a monitored signal.

2. The card of claim 1, wherein the power management circuitry is operative to selectively step down the power source voltage by a voltage drop.

3. The card of claim 1, wherein the power management circuitry is operative to selectively directly couple the power source to the power consuming circuitry.

4. The card of claim 1, wherein the first circuitry is a processor.

5. The card of claim 1, wherein the monitored signal is a voltage provided by the power management circuitry.

6. A card comprising:
    a battery operative to supply power via a battery voltage, a voltage range of the battery including a maximum battery voltage and a minimum battery voltage; and power management circuitry coupled to receive power from the battery and provide managed power via an output node, the power management circuitry operative to selectively provide a power management voltage to the output node through a voltage protection path or a directly coupled path,
    wherein the voltage protection path reduces a magnitude of the battery voltage an amount,
    the directly coupled path effectively directly couples the battery voltage to the output node,
    the power management circuitry includes at least one circuit element selected from the group consisting of a transistor and a diode,
    the at least one circuit element is operable to receive an input signal, and the input signal is based on a comparison between a threshold and a monitored signal.

7. The card of claim 6, wherein the monitored signal is the power management voltage provided to the output node, and the power management circuitry selectively routes the battery voltage based on the input signal.

8. The card of claim 6, wherein the battery is a lithium polymer battery.

9. The card of claim 6, wherein the battery is a lithium ion battery.

10. The card of claim 6, wherein the battery is a nickel cadmium battery.

11. The card of claim 6, wherein the power management circuitry further comprises a path selection node, and the card further comprises a processor, wherein the processor includes monitoring circuitry and is operative to supply the input signal to the at least one circuit element.

12. The card of claim 6, wherein the voltage protection path comprises a BJT transistor.

13. The card of claim 6, wherein the voltage protection path comprises a diode.

14. The card of claim 6, wherein the directly coupled path comprises a field effect transistor.

15. A card comprising:
    a lithium polymer battery;
    power management circuitry coupled to the battery and operative to provide managed power; and
    processor circuitry coupled to receive the managed power from the power management circuitry,
    wherein the power management circuitry is operative to manage power according to either a voltage protection mode or a direct voltage mode,
        the power management circuitry includes at least one circuit element selected from the group consisting of a transistor and a diode,
        the at least one circuit element is operable to receive an input signal, and the input signal is based on a comparison between a threshold and a monitored signal.

16. The card of claim 15, wherein the battery has a thickness ranging between about 0.38 mm and 0.42 mm.

17. The card of claim 15, wherein the battery has a thickness of about 0.40 mm.

18. The card of claim 15 further comprising:
    a dynamic magnetic stripe communications device.

19. The card of claim 15 further comprising:
    a display; and
    a user interface.

20. The card of claim 15, wherein during the voltage protection mode, a magnitude of a voltage associated with the managed power is a voltage drop less than a voltage magnitude of a battery supply voltage.

21. The card of claim 15, wherein during the direct voltage mode, a magnitude of a voltage associated with the managed power is substantially a same magnitude as a voltage magnitude of a battery supply voltage.

22. A method for managing supply of power in a card, the card comprising at least first circuitry having a maximum operating voltage, the method comprising:
    receiving power from a power source, the received power associated with a power source voltage, a voltage range of the power source voltage including a maximum power source voltage and a minimum power source voltage;
    monitoring a power signal;
    providing an input signal to at least one circuit element based on a comparison between the monitored power signal and a threshold, wherein the at least one circuit element is selected from the group consisting of a transistor and a diode; and
    selectively routing the power source voltage through one of at least two paths based on the input signal such that a maximum possible managed power voltage is provided to at least the first circuitry, without the maximum possible managed power voltage exceeding the maximum operating voltage.

23. The method of claim 22, wherein the monitored power signal is a managed power voltage, the selectively routing includes controlling which path the power source voltage is selectively routed through in response to the input signal, and the input signal is a voltage.

24. The method of claim 22, wherein the power source voltage degrades from the maximum power source voltage to the minimum power source voltage over time, and wherein the power source voltage is routed through a path that reduces the power source voltage by a target voltage when the power source voltage is greater than the maximum operating voltage.

25. The method of claim 22, wherein the power source voltage degrades from the maximum power source voltage to the minimum power source voltage over time, and wherein the power source voltage is routed through a path such that a managed power voltage is substantially same as the power source voltage when the power source voltage is less than the maximum operating voltage.

* * * * *